United States Patent [19]

Doyle et al.

[11] 4,248,811
[45] Feb. 3, 1981

[54] SAFETY TIRES, METHODS AND EQUIPMENT THEREFOR

[76] Inventors: Earl N. Doyle, 1737 Campbell, Houston, Tex. 77055; Rene Trevino, Box 816, Friendswood, Tex. 77546; Richard S. Hicks, 3737 Hillcroft, Houston, Tex. 77057

[21] Appl. No.: 857,697

[22] Filed: Dec. 5, 1977

[51] Int. Cl.³ ............... B29D 27/04; C08G 18/14
[52] U.S. Cl. .................... 264/46.6; 264/46.9; 521/110; 521/130; 521/131; 521/167; 521/172; 521/176
[58] Field of Search ................. 137/223; 141/1, 5, 9, 141/38; 152/310, 415; 521/130, 131, 110, 167, 172, 176; 264/46.6, 46.9

[56] References Cited

U.S. PATENT DOCUMENTS

| 3,022,810 | 2/1962 | Lambe | 152/310 |
| 3,095,386 | 6/1963 | Hudson | 521/130 |
| 3,567,663 | 3/1971 | Triolo et al. | 521/130 |
| 3,605,848 | 9/1971 | Lombardi et al. | 521/176 |

Primary Examiner—Frederick R. Schmidt
Attorney, Agent, or Firm—Burns, Doane, Swecker & Mathis

[57] ABSTRACT

Equipment and formulations for the filling of ordinary pneumatic tires with a polyurethane foam, whereby all types, sizes and pressure ratings may be accurately filled, matching the ride and handling characteristics and load-bearing properties of air-filled tires and providing longer wear for the tires while at the same time providing puncture and blow-out proof tires.

8 Claims, 4 Drawing Figures

SAFETY TIRES, METHODS AND EQUIPMENT THEREFOR

BACKGROUND OF THE INVENTION

Tires have been filled for a number of years, with a number of types of materials, by varying processes as disclosed in a number of U.S. patents. Most of these materials and processes, however, have serious drawbacks in actual practice.

The most successful, and the most widely used at present, presenting fewer drawbacks than other methods, is that shown in U.S. Pat. No. 3,866,651. This is a solid polyurethane elastomer system. With this system, cost and weight are the major drawbacks, plus the fact that these tires are limited to rather low continuous speeds. These drawbacks limit the market for this system mostly to industrial vehicles where flat tires constitute serious delays in time consumed in changing tires. The end product is excellent for the use for which it is intended, but has the above-noted limitations in market development into other types of vehicle tires.

U.S. Pat. No. 3,022,810 shows a polyurethane foam system, blown with compressed air. Other U.S. Pat. Nos. such as 3,854,516 and 3,605,848 also describe polyurethane foam compounds for filling tires. These systems have been tried on a limited scale, but have not been successful, since the foam could not be controlled accurately to match the load-bearing properties for the different pressures the tires were designed for. The wide range of tires on the market are designed for pressures from some 10 PSI on through 120 PSI, and load bearing characteristics must match the pneumatic pressures. Another major drawback in these systems is that the foam could not be placed in the tires in such a manner that equal densities could be had throughout the tire, and usually densities were greater at the fill point than at the bleed point, resulting in tires which were seriously out of balance and with one side of the tire having higher load-bearing properties than the opposite side. U.S. Pat. No. 3,854,516 tries to eliminate this last problem by rotating the tire while filling, and at the same time using this motion to mix the ingredients making up the foam material, but due to the nature of polyurethane foam, cell structure will collapse if any appreciable motion occurs during a critical period of the rise and gel of the foam, so by trying to eliminate one problem, another problem was created.

Other patents, as well as the above-mentioned, have tried both open cell foam and closed cell foam for the filling of tires. U.S. Pat. No. 3,605,848 entails open-cell foam, while U.S. Pat. No. 3,022,810 entails closed cell foam. Open cell foam has the disadvantage of creating excess flexural heat during operation of the tire, even at relatively low speeds, which seriously empair tire life due to fatigue and deterioration of the polyurethane. Other U.S. patents relating to filled tires include U.S. Pat. Nos. 3,994,329; 3,987,832; 3,915,774; 3,907,018; 3,872,201; 3,494,607; 3,381,735; 3,331,423; 3,208,497; 3,112,785; 3,952,786; 3,866,652; 3,646,983; 3,256,123; 3,179,148; and 3,095,917.

To date, and to our knowledge, no one else has been successful in formulating a polyurethane foam and filling an object with a resilient, flexible polyurethane foam with high (over 90%) closed cells which would not shrink and deform during the curing process. We believe we have the only existing system by which tires of any given size and pressure ratings may be successfully filled accurately and fully balanced, to match the intended pressure ratings from some 10 PSI on through 120 PSI with good handling characteristics and good tire wear life.

OBJECTS AND SUMMARY OF THE INVENTION

It is an object of the present invention to provide formulations, processes and equipment whereby polyurethane foam may be injected into tires of all types, sizes, and pressure ratings, giving an end product which is fully balanced, of equal foam density throughout the tire, which is flat-free and blow-out proof, at costs which will greatly increase the potential market over the solid elastomer fill currently used.

It is further an object of the present invention to utilize equipment currently being used for the proportioning of two component systems (two package, or two container systems) with the addition of relatively simple, low-cost auxiliary equipment of our manufacture to form the present equipment which can be used by personnel already trained to use the two component equipment conveniently, with very few changes in normal procedures in filling tires with the solid elastomer.

It is also an object of the present invention to provide a foam polyurethane-filled tire (and a method and equipment for forming same) which will withstand higher speeds than the present solid elastomer filled tire system, even up to highway speeds of 70 mph and because of the lower cost and weight factors, may be utilized in a far greater variety of tires for a wide variety of vehicles both on and off-the-road.

It is further an object of this invention to create entirely new markets for foam polyurethane-filled tires which the present solid fill tire system cannot staisfy because of the high weight and cost factors.

SUMMARY

In one aspect the present invention provides a method for completely filling a tire casing with a closed cell polyurethane foam of substantially uniform density throughout the casing comprising mixing a liquid frothing agent with first liquid mixture of a catalyst, surfactant and long oil or tall oil fatty acid to foam a second liquid mixture, mixing said second liquid mixture with a third liquid mixture comprising an NCO-terminated prepolymer to form a fourth liquid mixture whereby said first and third liquid mixtures begin reacting to form a polyurethane while maintaining the frothing agent liquid, and introducing said fourth liquid mixture into a tire casing under pressure conditions whereby said frothing agent vaporizes and foams the polyurethane within the tire casing.

In another aspect, the present invention provides a tire comprising a casing and a filler within said casing, said filler comprising a closed-cell, non-shrinking polyurethane foam of essentially equal density throughout the tire, said polyurethane foam being formed of a mixture of a first component comprising an NCO-terminated prepolymer, a second component comprising a hydrogen donor, a surfactant and a long oil or a tall oil fatty acid, the surfactant and long oil or tall oil fatty acid being present in amounts sufficient to produce non-shrinking characteristics and a third component comprising a compound which is a liquid at the time the mixture is formed and which volatilizes upon entry of the mixture into the tire thereby producing a foam of the desired density.

In still another aspect, the present invention provides an apparatus useful for the filling of a tire casing with a foamed polyurethane of a desired density comprising first pumping means having a fixed plate and a yoke moveable with respect to said plate for separately pumping first and second liquid components of said polyurethane foam under elevated pressure, second pumping means having a member moveable with respect thereto adapted for pumping a selectable amount of a third liquid component, linkage means having a first member pivotably connected to said plate and a second member pivotably connected to said yoke, said first and second members being pivotably connected together to provide a scissors action as said plate moves with respect to said yoke, means for selectably attaching said moving member to said first linkage member at different positions therealong, means for selectably attaching said second pumping means housing to said second linkage member at different positions therealong to provide a pumping action for pumping a selectable amount of said third liquid component under elevated pressure, chamber means for receiving and mixing said components under elevated pressure and means for depositing said mixed components under pressure into said tire.

A solid polyurethane elastomer such as now being used has a weight of 72–75 lbs. per cu. ft. and filling a tire which normally carries 25 PSI requires as much of this material per cu. ft. as a tire which normally carries 100 PSI. In our system and as described hereinbelow, densities, and thus cost and weight decrease tremendously as the PSI ratings decrease. In a tire which normally carries 15 PSI, a foam will be used at approximately 10 lbs. per cu. ft. In a 25 PSI tire, approximately a 13 lb. per cu. ft. foam will be used. In a 40 PSI tire, approximately a 16 lb. per cu. ft. foam will be used, and in a 100 PSI tire approximately a 26 lb. per cu. ft. foam will be used. These foams at these densities will match the load-bearing characteristics of the pneumatically filled tire, and closely match the feel and handling characteristics. Thus, weight and cost factors are reduced over the solid fill system proportionately as tire pressure decreases. Even at the 100 PSI ratings, the tires of the present invention uses only about 36% as much material as the solid filled system. For tires having the lower pressure ratings, (e.g., down to about 15 PSI) the tires of the present invention use only about 14% as much material as the solid filled tire systems. Since the resiliency of our foam closely approximates an air-filled tire, the tire is permitted to flex and function almost normally, greatly improving the wear characteristics over the solid filled tire, which in essence becomes a solid rubber tire. Other advantages of this invention will become apparent as descriptions of the process proceed.

DETAILED DESCRIPTION OF THE INVENTION

The present invention provides an improved method and apparatus for filling a tire casing with a foamed polyurethane so as to result in a tire filled with a uniform density foam which density can be varied depending upon the load bearing characteristics desired of the filled tire.

Figure 1:
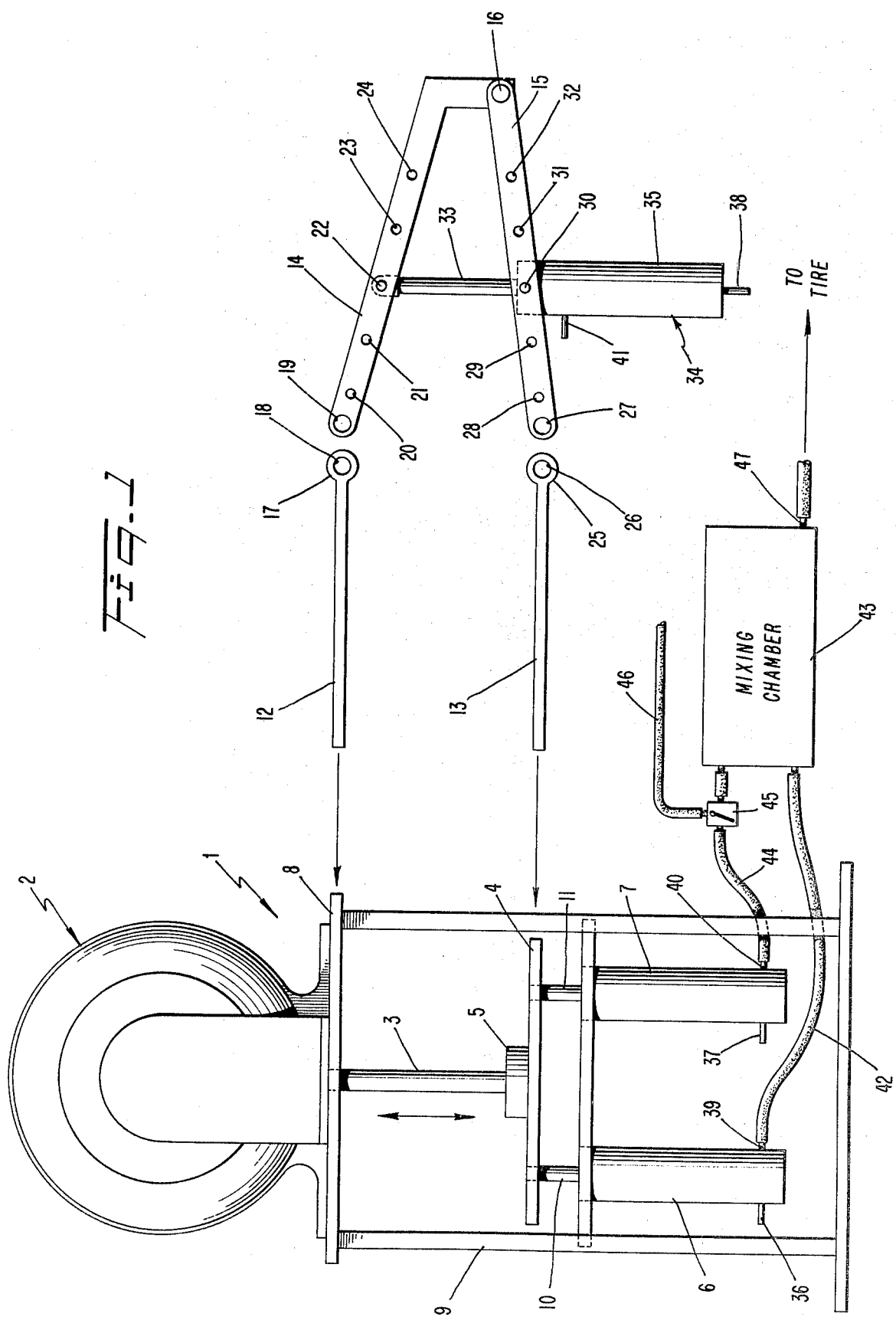
FIG. 1 is a representation of the mixing and dispensing apparatus of the present invention.

Referring to FIG. 1, a conventionally available two-component airless pump is indicated generally as 1. Pump 1 includes a motive power (a large air motor) generally indicated as 2, shaft 3 actuated by the motive power 2 and extending through stationery plate 8. Yoke 4 is attached to shaft 3 by bushing 5 to act upon twin pumps 6 and 7 by pistons 10 and 11, respectively, attached to yoke 4. All of the components are held within frame 9.

Plate 12 is attached to or can be made integral with stationery plate 8 while plate 13 is attached to or can be made integral with moveable yoke 4 which actuates pumps 6 and 7. Plates 12 and 13 are connected to moveable arms 14 and 15, respectively, which are attached to each other at swivel point 16. Plate 12 terminates in an enlarged portion 17 having a hole 18 therein. Plate 12 may be connected to arm 14 by suitable attachments (not shown) such as bolts or the like, through hole 18 corresponding enlarged hole 19 in arm 14. Plate 13 similarly terminates in an enlarged end 25 with a hole 26 therein which may be connected to arm 15 through hole 27.

The piston 33 of a smaller pump 34 is attached to arm 14 at any one of the positions 20, 21, 22, 23 or 24 by any suitable attaching means (not shown) while the pump cylinder 35 is attached to arm 15 at any one of the positions 28, 29, 30, 31 or 32 (which correspond in position and spacing to positions 20–24 in arm 14 as hereinafter described) also by any suitable attaching means (not shown). As shown in FIG. 1, pump 34 is attached to arms 14 and 15 at positions 22 and 30, respectively. The operation of pump 1 during which the shaft 3 and yoke 4 reciprocate while plate 8 remains stationary imparts a stroke to the pump 34, the length of which varies depending on which positions the pump cylinder 35 and piston 33 are attached to. It will be understood that the pump piston 33 and cylinder 35 are each attached to those corresponding spaced positions in each arm.

Each of pumps 6, 7 and 34 has an inlet (36, 37 and 38, respectively) and outlet (39, 40 and 41, respectively). The outlet 39 from pump 6 is in fluid communication via pipe 42 with mixing chamber 43. The outlet 40 from pump 7 is in fluid communication via pipe 44 with mixing chamber 43. Pipe 44 near mixing chamber 43 also includes a check valve 45 which is in fluid communication with outlet 41 from pump 34 via pump 46. The outlet 47 of the mixing chamber 43 is in fluid communication with a tire casing (not shown in FIG. 1).

In the method of the present invention, an NCO-terminated prepolymer composition (described in greater detail hereinbelow) is conducted by suitable means (not shown) through inlet 36 from a suitable source (not shown) into pump 6 from where it is pumped into the mixing chamber 43 via pipe 42 under suitable pressure as applied by pump 1. A hydrogen donor composition (described in greater detail hereinbelow) is conducted by suitable means (not shown) through inlet 37 from a suitable source (not shown) into pump 7 from where it is pumped through pipe 44 towards mixing chamber 43.

A liquid frothing agent (described in greater detail hereinbelow) is conducted by suitable means (not shown), through inlet 38 from a suitable source (not shown) into pump 34 from where it is pumped through line 46 to check valve 45 in line 44. As will be described hereinbelow, the pressure in line 46 is greater than that in line 44 so that the liquid frothing agent in line 46 enters line 44 through check valve 45 where it mixes with the hydrogen donor composition therein. The mixture then enters the mixing chamber 43 where it mixes and reacts with the prepolymer composition to form a polyurethane reaction product (including the unreacted, still liquid frothing agent). The mixing chamber is also under the pressure imparted by pump 1.

The polyurethane reaction product in the mixing chamber 43 is conducted under pressure through outlet 47 and suitable piping means (not shown) to the tire casing to be filled.

Figure 2:
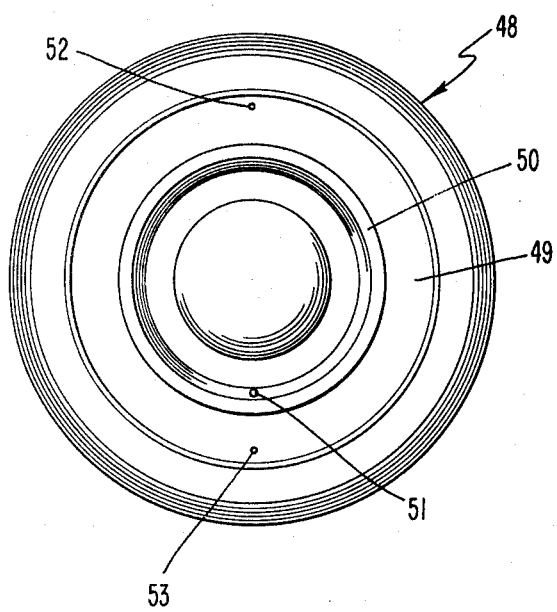
FIG. 2 is a representation of a tire casing to be filled according to the present invention.

A suitable tire casing is shown in FIG. 2 which depicts tire 48 which comprises a tire casing 49 mounted about a conventional wheel assembly 50. The normal valve stem opening is indicated at 51. Since the orifice of the valve stem opening is generally too small to allow rapid filling of the tire, two holes 52 and 53 (approximately one-quarter inch) are drilled into the tire diametrically opposite each other. Valves 54 and 55 (described below) are disposed in holes 52 and 53, respectively.

Figure 3:
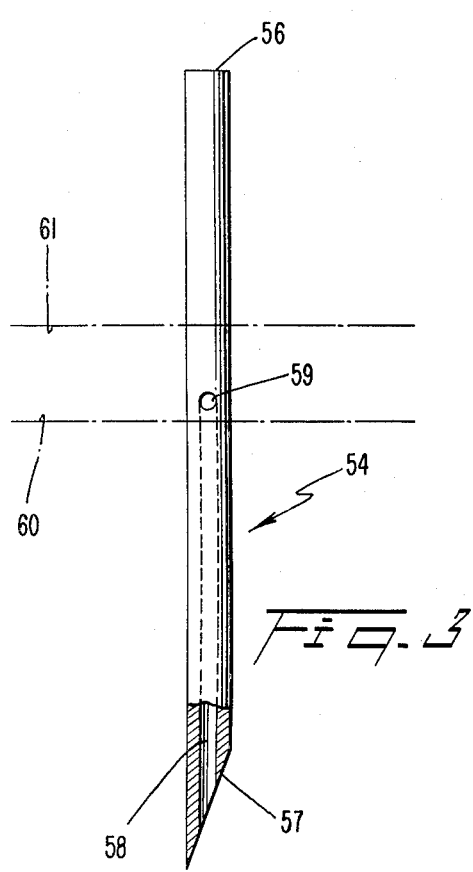
FIG. 3 is a representation of a valve used in filling the tire casing.

As shown in FIG. 3, air bleed valve 54 has one sealed end 56 which is the upper (or external) end. The other end 57 of valve 54 has a conduit 58 therein which extends through the valve 54 to orifice 59 which is located between the ends of the valve. During filling of the tire, valve 54 is inserted into hole 52 up to a level generally indicated as 60 so that the air within the tire can continuously exit through conduit 58 and orifice 59. As soon as foam begins to emerge from orifice 59 showing that the tire is full of foam, the valve 54 is further inserted into the tire to the level indicated generally as 61, thus blocking orifice 59 so that the foam is fully contained within the tire during the reaction time.

Figure 4:
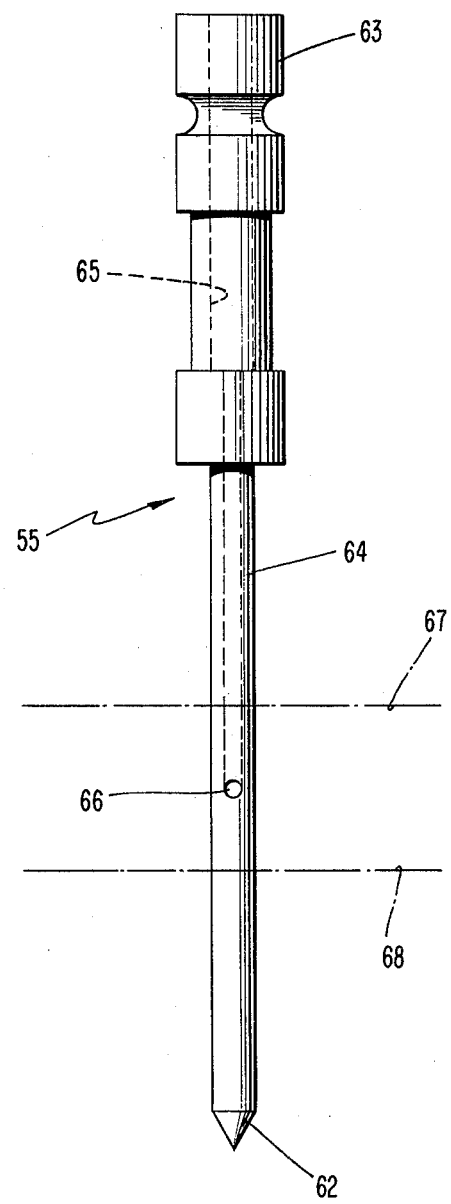
FIG. 4 is a representation of another valve used in filling the tire casing.

FIG. 4 shows material valve 55 through which the polyurethane reaction product is pumped into the tire. The sharp (or internal) end 62 of the valve body 64 is sealed. The upper (or external) end includes a quick 62 disconnect (or snap fit) end generally indicated as 63. The valve body 64 contains a conduit 65 therein which extends through the valve body 64 to orifice 66. During filling, valve 55 is inserted to the level generally indicated as 67 placing the orifice 66 within the tire. The polyurethane reaction product from the mixing chamber enters (by pipe not shown which connects to the quick disconnect end 63) the valve 55 through the conduit 65 and enters the tire through orifice 66. When filling is completed, the valve 55 is withdrawn slightly to the level generally indicated as 68 thus blocking the foam inside the tire from escaping.

The valves 54 and 55 are left in place until the reaction and final setting of the foam has been completed (usually about 20 to 30 minutes). By utilizing a multiplicity of these valves, a great number of tires may be filled rapidly and conveniently. The valves, after removal from the tire, may easily be cleaned out and reused.

The present invention is particularly adapted for the production of polyurethane foams of different densities which is particularly useful in the filling of tires having different load bearing characteristics. That is, for the same polyurethane, the density thereof will vary with the amount of frothing agent present in the polyurethane between the initial reaction and the curing thereof. The different settings available for pump 34 (the frothing agent pump) along the arms 14 and 15 determine the percentage of the frothing agent simply by adjustment of the length of the stroke of the pump 34 relative to the fixed length of the stroke of pumps 6 and 7. The percentage of the frothing agent component becomes greater as pump 35 is moved to the left as shown in FIG. 1, toward the other two pumps, where the stroke of pump 35 is longer as compared to the strokes of pumps 6 and 7, and smaller as the pump 35 is moved to the right as shown in FIG. 1, away from pumps 6 and 7, where the stroke of the pump 34 is shorter as compared to the strokes of pumps 6 and 7. This construction accurately controls the percentages of frothing agent to assure the desired density of foam in each tire.

As described above, the tire casing is filled with a polyurethane foam formed from three liquid components, namely, a first component which comprises an NCO-terminated prepolymer (or "A" component), a second component which comprises a hydrogen donor (or "B" component) and a third component which comprises a frothing or foaming agent. The third component is mixed with the second component before the mixture is mixed with the first component.

The use of a two-component system (including a foaming agent) to form a polyurethane is, of course, well-known in the art and is described in the literature, for example, in "The Development and Use of Polyurethane Products", E. N. Doyle, McGraw-Hill Book Co. (1971) cited hereafter as "Doyle". While many of the constituents of the components used in the present invention are known per se the components are formulated and used in a manner heretofore unrecognized to yield a filled tire having ride and handling characteristics and load-bearing properties like those of air-filled tires.

The first or A component contains an NCO-terminated prepolymer. Such prepolymers are known in the art (See for Example, Doyle, pp. 29–43) and comprise a mixture of a diisocynate, such as toluene diisocynate or 4,4'-diphenylmethane diisocynate with a hydrogen donor such as polyoxypropylene glycol or a hydroxyl-terminated polybutadiene to yield a NCO-terminated prepolymer which will react with the remainder of the hydrogen donor in the B component to form the polyurethane. The diisocynate and hydrogen donors are conventional compounds and the choice of the particular diisocyanate and hydrogen donor may vary according to the specific properties desired in the polyurethane in a manner understood by the skilled artisan.

The second or B component contains the remainder of the hydrogen donors necessary to react with the NCO-terminated prepolymer to form the polyurethane. A single hydrogen donor or a mixture of hydrogen donors may be utilized. Again, the hydrogen donors are conventional and the choice of a particular hydrogen donor may be determined by the skilled artisan to achieve the particular properties desired. The hydrogen donors are generally one or more of polyols, glycols or triols (such as glycercine-based triols, castor oil, polyoxypropylene glycol aliphatic amine based polyol, piperazine-based polyol) or hydroxy-terminated polymers such as polybutadiene. See also, Doyle, pages 44 et seq. for a listing of conventional hydrogen donors.

The second or B component also contains the catalyst which can be any suitable urethane polymerization catalyst such as, for example, tin or lead octoate or a tertiary amine catalyst (see also, Doyle, pp 64–67) and other additives (dyes and the like). The second or B component also contains a mixture of constituents sufficient to provide the resulting polyurethane with a closed-cell, non-shrinking character. In particular, the B component contains a surfactant, such as a silicone surfactant, for example an organo-silicone block copolymer, in an amount of from about 0.5 to 3, preferably from about 1 to 1.5, weight percent of the total of the A and B components and a long oil or tall oils derived from linseed oils and wood rosins, such as a $C_{12}$ to $C_{22}$ saturated or unsaturated fatty acid or mixtures thereof, for example, oleic acid lauric acid, lineolic acid or tall oil fatty acids, (see also Doyle pp. 85, 86) in an amount of from about 1 to about 5, preferably from about 2 to about 3, weight percent of the total of the A and B components.

Generally, the A and B components are each premixed and pumped from the pumps 6 and 7, respectively at a pressure of from about 200 to 500, preferably from about 300 to 450, psig to the mixing chamber 43. The third component (the frothing or foaming agent) is pumped from pump 34 at a pressure slightly higher than the pressure of the B component so that it will be mixed with the B component through check valve 45 without the B component backing up through check valve 45 with line 46.

The frothing agent can be any suitable foaming agent which is non-reactive with the urethane reactants, liquid at the mixing temperature (e.g., usually ambient) and pressure (as given above) and which will vaporize upon entry of the mixed components from the mixing chamber into the tire to be filled. The tire is maintained at ambient pressure and the entry of the mixed components into the tire results in a sudden drop in pressure (e.g., from the 100 to 500 psig pressure in the mixing chamber and any pipe attached thereto for use in inserting the mixture into the tire to the ambient pressure in the tire) which gives essentially instantaneous frothing. Since the material is fully placed into its final position and final expansion by the time the tire is entirely full, there is no problem in obtaining an even density throughout the tire, meaning a well-balanced tire.

Suitable frothing agents include low boiling inorganic (e.g., carbon dioxide) and organic compounds e.g., the lower alkanes such as propane or ethane or the fluorocarbons such as Freon 12 (dichlorodifluoromethane), Freon 22 ($CHClF_2$), Freon 23 ($CHF_3$) or Freon 116 ($C_2F_6$) or the like).

The amount of frothing agent is dependent on the density desired in the foamed polyurethane and the density depends on the load bearing characteristics of the filled tire. In this manner, a filled tire can be prepared having the load bearing characteristics of a pneumatic tire. In a tire which normally carries 15 psi, a foam will be used at approximately 10 lbs. per cu. ft. In a 25 psi tire, approximately a 13 lb. per cu. ft. foam will be used. In a 40 psi tire, approximately a 16 lb. per cu. ft. foam will be used, and in a 100 psi tire approximately a 26 lb. per cu. ft. foam will be used. These foams at these densities will match the load-bearing characteristics of the pneumatically filled tire, and closely match the feel and handling characteristics. Thus, not only is weight and cost factors reduced over the solid fill system proportionately as tire pressure decreases, but the amount of material used is substantially reduced. Since the resiliency of the foam closely approximates an air-filled tire, the tire is permitted to flex and function almost normally.

The amount of the frothing amount is dependent on the stroke of the pump 34. That is, the shorter the stroke, the smaller the amount of the frothing agent and the higher the density of the foam while conversely, the longer the stroke, the greater the amount of the frothing agent and the lower the density of the foam. Generally, the amount of the frothing agent varies from about 1.0 to about 3.5 weight percent of the total amount of the A and B components.

It will be understood that the A and B components (including the frothing agent) begin to react to form the polyurethane upon mixing. No foaming takes place until the mixture is inserted into the tire and the frothing agent is allowed to vaporize. The polyurethane has an initial set of about 10 minutes and the exotherm finishes in about 30 minutes. The mixture in the mixing chamber has thus a pot life of about 10 minutes and must be injected into the tire within 10 minutes after mixing to insure proper frothing and setting in the tire.

The invention is additionally illustrated in connection with the following Examples which are to be considered as illustrative of the present invention. It should be understood, however, that the invention is not limited to the specific details of the Examples.

EXAMPLE I

Using the equipment of FIGS. 1-3, the following components were utilized:

Component A (A prepolymer)

Toluene Diisocyanate 6 equivalents 522.0 lbs.
Polyoxypropylene glycol 2000 molecular weight 1000.0 lbs.

Component B

Polyoxypropylene glycol 0.9 equivalents 900.0 lbs.
Glycerine based triol E.W. 236—1.1 equivalents 259.6 lbs.
Aliphatic amine based polyol E.W. 89—2.5 equivalents 222.5 lbs.
Piperazine based polyol E.W. 102—0.5 equivalents 51.0 lbs.
Organo-silicone block copolymer (surfactant) 30.0 lbs.
Tin octoate catalyst 4.5 lbs.
Tertiary amine catalyst 4.5 lbs.
Tall oil Fatty Acid 30.0 lbs.

Freon 12 (dichlorodifluoromethane, b.p. $-29.9°$ C.) was mixed with Component B through check valve 45 before Component B entered the mixing chamber in an amount of 3.2% of total of A and B components. The A and B components were at 400 psig while the Freon 12 was pumped in at 440 psig. The A and B components (including the liquid Freon 12 in the latter) were mixed in the mixing chamber and pumped very soon thereafter into a tire casing. These components were formulated for a tire to be used at relatively low speeds of 40–45 mph (that is, a 25 psig tire). The materials entered the tire through valve 55 which was inserted in a ¼" hole in the tire to a point where the orifice 66 was inside the casing. Valve 54 was inserted in the tire in another ¼" hole on the other side of the tire to the level 60.

The polyurethane foamed immediately upon entering the tire. As soon as foam began coming through orifice 59 in valve 54, valve 54 was inserted to level 61, the pumping of the polyurethane was stopped and valve 55 was pulled out to level 68.

After thirty minutes, the valves 54 and 55 were removed and cleaned. The tire was foam-filled with an even density of closed-cell, non-shrinking foam. The tire was well balanced.

EXAMPLE II

Example I was repeated for a tire designed for higher highway speeds (e.g., a 40 psi tire) using the following components:

Component A (A prepolymer)

4,4'-diphenylmethane diisocyanate (MDI) 5 equivalents 665 lbs.
Hydroxyl-terminated polybutadiene 1 equivalent 1250 lbs.

Component B

Hydroxyl-terminated Polybutadiene 1.1 equivalent 1375 lbs.
    Castor Oil 1 equivalent 340 lbs.
    1,4-Butanediol 1 equivalent 45.0 lbs.
    Amine based polyol 0.9 equivalents 80.1 lbs.
    Silicone surfactant 35.0 lbs.
    Tertiary amine catalyst 4.5 lbs.
    Lead octoate catalyst 4.5 lbs.
    Tall oil Fatty Acid 30.0 lbs.

Again, blowing or frothing is accomplished by the third component (Freon 12) being injected as a separate component at the mixing chamber in an amount of 2.6% of the total of A and B components. The tire was also well-balanced and filled with equal density, closed cell polyurethane foam. It will be noted in both Examples that the B component is somewhat less in total weight than Component A. This is because the machines used in this work proportion by volume, rather than by weight, so formulations must be on a 1:1 ratio by volume, not by weight. The formulation of Example II will withstand considerably higher temperature than the first example given, because of the hydroxyl terminated polybutadiene and the MDI type of backbone of the polymer. Polybutadiene is notoriously incompatible (will not stay in solution) with most other hydrogen donors of this type, so the castor oil, such as Spencer-Kellogg's DI or Baker's DB castor is used to accomplish compatibility (shelf stability) of the B Component. It will be readily apparent to those skilled in the art that many substitutions for the various components may be used. It is our intent that the examples given are merely to demonstrate the types of reactants and additives that may be used in such formulations, and not limited to those given as examples.

SUMMARY OF ADVANTAGES

Some of the advantages of our foam filled tire become apparent over the solid elastomer currently being used, and the prior patents on foam filling of tires, that is, lower cost and lower weight and faster fillings are apparent over the solid fill systems while equal and adjustable densities with perfectly balanced tires are apparent over previous foam systems. Additionally, separate types of formulations, one for the lower speed vehicles, and a separate, slightly higher cost formulation for the higher speeds up to 70 mph, with considerably lower heat build-up in the tires simply because of lesser total quantities of rubber placed into the tire and definite advantages over the solid fill tires. Proper load-bearing properties of each tire, at whatever the pneumatic pressure rating of the tire, simply by the adjustment of the percentage of frothing agent is another great advantage over the solid filled tires, giving a better feel and handling characteristics, and allowing much improved mileage for each tire.

Applications for the invention are almost endless. Military vehicles may be a prime application, since bullet holes would not stop the operation of the vehicle. Flat tires are a nuisance and inconvenience, while blow-outs are extremely dangerous on most types of vehicles. Our system prevents both, saving time, inconvenience, and danger. Recreation vehicles, industrial vehicles, mowing machines for highways, garbage trucks, off-the-road earth moving equipment, mining equipment, and all types of vehicles can take advantage of a flat-free and blow-out proof tire.

A good example of weight and cost savings would be in a large tire requiring 10 cu. ft. of material to fill, that normally works at 15 psi pneumatic pressure. This tire would require 720 lbs. of the solid fill material, yet only 100 lbs. of our material. The same size tire, if it requires normally 100 psi pneumatic pressure, would still require the 720 lbs. of the solid material, yet only 260 lbs. of our material. Some of the large tires in industry today require as much as 100 cu. ft. of material to fill each tire. Obviously, our cost and weight advantage is greater in the low pressure tires, but even at the 100 psi level, it only requires 30% of our material to fill a given tire as with the solid fill material, while cost, labor and time for filling decrease in proportion.

There has been much research into a material and process for foaming filling pneumatic tires. Doyle at p. 236 suggested this application when the book was copyrighted in 1971, and the matter has been constantly researched and tested from that time forward. Now, after a number of years, the formulations and process to inject a closed cell resilient foam (above 90% closed cell) which does not shrink during cure at ambient temperatures and equipment and process by which the foam may be properly placed in a tire so the tire will be balanced, and at the proper densities and load-bearing properties to support the designated loads the tire is designed for with pneumatic pressures has been perfected.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:
1. A method for completely filling a tire casing with a thermosetting, three component, closed-cell polyurethane foam comprising:
    mixing a first component non-reactive liquid frothing agent with a second component comprising a liquid mixture of (1) a hydrogen donor comprising (a) a diol selected from the group consisting of polyoxypropylene glycol and hydroxyl terminated polybutadiene (b) optionally at least one glycerine based triol and (c) at least one polyol selected from the group consisting of aliphatic amine based polyols, castor oil, and piperazine based polyols; (2) an organo-silicone block copolymer surfactant; and (3) a tall oil fatty acid to form a first liquid mixture; mixing said first liquid mixture with a third component comprising an NCO-terminated prepolymer, said prepolymer being selected from the group consisting of polyoxypropylene glycol and hydroxyl terminated polybutadiene to form a second liquid mixture wherein (1) the ratio of the equivalent weight of the hydrogen donor of the second component to the equivalent weight of the NCO-terminated prepolymer of the third component, is from about 1:1.04 to about 1:1.06; (2) the equivalent weight ratio of the diol, triol, and polyol which constitute the hydrogen donor is from about 1:1.2:3.3 to about 1:0:2.0 respectively; (3) the surfactant and tall oil fatty acid are present in an amount sufficient to impart a non-shrinking characteristic to said closed cell foam; and (4) the frothing agent is present in an amount sufficient to control the density of the foam to the extent necessary to impart the required load bearing characteristics to the tire casing;

reacting the second and third components of the second liquid mixture to form a polyurethane while maintaining the frothing agent liquid; and introducing said second reacting liquid mixture into a tire casing under pressure conditions whereby said frothing agent vaporizes and foams the polyurethane within the tire casing to achieve a substantially uniform density throughout.

2. The method of claim 1 wherein said liquid frothing agent is mixed in an amount of from about 1.0 to about 3.5 percent by weight of the total amount of the second and third components.

3. The method of claim 1 wherein the second component contains from about 0.5 to about 3 percent by weight of the second and third components of the surfactant and from about 1 to about 5 percent by weight of the second and third components of the tall oil fatty acid.

4. The method of claim 1 wherein the second component contains from about 1 to about 1.5 percent by weight of the second and third components of the surfactant and from about 2 to about 3 percent by weight of the second and third components of the tall oil fatty acid.

5. The method of claim 1 wherein the frothing agent is carbon dioxide, a lower alkane or a fluorocarbon.

6. The method of claim 1 wherein said mixtures are maintained under a pressure of from about 100 to 500 psi until being introduced into said tire casing.

7. The method of claim 1 wherein the hydrogen donor comprises a mixture of polyoxypropylene glycol, glycerine based triol, aliphatic amine based polyol, and piperazine based polyol, the catalyst is a mixture of tin octoate and a tertiary amine, the NCO-terminated prepolymer is the reaction product of toluene diisocyanate and polyoxypropylene glycol, and the equivalent weight ratio of the hydrogen donor to the NCO-terminated prepolymer is about 1:1.06.

8. The method of claim 1 wherein the hydrogen donor is a mixture comprising hydroxyl terminated polybutadiene, castor oil; 1,4-butane diol, and an amine based polyol; the NCO-terminated prepolymer is the reaction product of 4,4'-diphenylmethane diisocyanate and a hydroxyl terminated polybutadiene; the equivalent weight ratio of the hydrogen donor to NCO-terminated prepolymer is about 1:1.04 and the catalyst is a mixture of a tertiary amine and lead octoate.

* * * * *